(12) United States Patent
Sonnendorfer et al.

(10) Patent No.: US 8,950,567 B2
(45) Date of Patent: Feb. 10, 2015

(54) SHOPPING TROLLEY

(76) Inventors: Horst Sonnendorfer, Puchheim (DE);
Franz Wieth, Puchheim (DE)

( * ) Notice: Subject to any disclaimer, the term of this patent is extended or adjusted under 35 U.S.C. 154(b) by 987 days.

(21) Appl. No.: 11/815,531

(22) PCT Filed: Jan. 24, 2006

(86) PCT No.: PCT/DE2006/000105
§ 371 (c)(1),
(2), (4) Date: Aug. 3, 2007

(87) PCT Pub. No.: WO2006/081793
PCT Pub. Date: Aug. 10, 2006

(65) Prior Publication Data
US 2008/0116033 A1    May 22, 2008

(30) Foreign Application Priority Data
Feb. 3, 2005    (DE) .................... 20 2005 001 770 U

(51) Int. Cl.
| | | |
|---|---|---|
| *G07F 7/00* | (2006.01) | |
| *B62D 39/00* | (2006.01) | |
| *G07F 7/06* | (2006.01) | |
| *B62B 5/04* | (2006.01) | |

(52) U.S. Cl.
CPC ............ *G07F 7/0618* (2013.01); *B62B 2/1404* (2013.01); *B62B 5/0423* (2013.01); *Y10S 194/905* (2013.01); *Y10S 70/41* (2013.01); *Y10S 280/04* (2013.01)
USPC . 194/212; 194/905; 70/DIG. 41; 280/33.994; 280/DIG. 4; 188/265

(58) Field of Classification Search
USPC ............... 194/212, 905; 280/DIG. 4, 33.991, 280/33.994, 33.992; 70/DIG. 41, DIG. 17; 188/1.12, 19; 16/35 R
See application file for complete search history.

(56) References Cited

U.S. PATENT DOCUMENTS

| | | | | |
|---|---|---|---|---|
| 2,679,302 | A * | 5/1954 | Watson et al. ................. | 188/31 |
| 4,545,591 | A * | 10/1985 | Balha ....................... | 280/33.994 |
| 4,691,816 | A * | 9/1987 | Trubiano .................... | 194/212 |
| 5,328,013 | A * | 7/1994 | Fuchs ........................ | 194/213 |
| 5,821,856 | A | 10/1998 | Lace | |
| 6,161,849 | A * | 12/2000 | Schweninger .......... | 280/33.994 |
| 6,746,030 | B1 * | 6/2004 | Bartlett ..................... | 280/47.38 |
| 7,026,748 | B2 | 4/2006 | Wammes | |
| 7,397,373 | B2 | 7/2008 | Hunt | |
| 2005/0155824 | A1 * | 7/2005 | Taba ............................. | 188/19 |

FOREIGN PATENT DOCUMENTS

| | | |
|---|---|---|
| CA | 2493397 A1 | 1/2004 |
| DE | 3239040 A1 | 4/1984 |

(Continued)

*Primary Examiner* — Mark Beauchaine
(74) *Attorney, Agent, or Firm* — Laurence A. Greenberg; Werner H. Stemer; Ralph E. Locher

(57) ABSTRACT

The invention relates to a trolley comprising an element for holding and releasing a token, said element comprising a sensor that detects whether the trolley comprising the element for holding and releasing the token is pushed inside another trolley. If this is the case, the element for holding and releasing the token activates the immobilizer and releases the token. In order to use the trolley, a token must be inserted into the element for holding and releasing the token, thus deactivating the immobilizer.

6 Claims, 1 Drawing Sheet

(56) References Cited

FOREIGN PATENT DOCUMENTS

| | | |
|---|---|---|
| DE | 20208621 U1 | 8/2002 |
| DE | 202004003005 U1 | 7/2004 |
| EP | 0077690 A1 | 4/1983 |
| EP | 0536611 A1 | 4/1993 |
| FR | 28483323 A1 | 6/2004 |
| JP | 6206546 A | 7/1994 |
| JP | 10513285 T | 12/1998 |
| WO | 9604161 A1 | 2/1996 |
| WO | 2004010394 A2 | 1/2004 |
| WO | 2004016138 A1 | 2/2004 |
| WO | 2004031650 A1 | 4/2004 |
| WO | 2004055743 A1 | 7/2004 |

\* cited by examiner

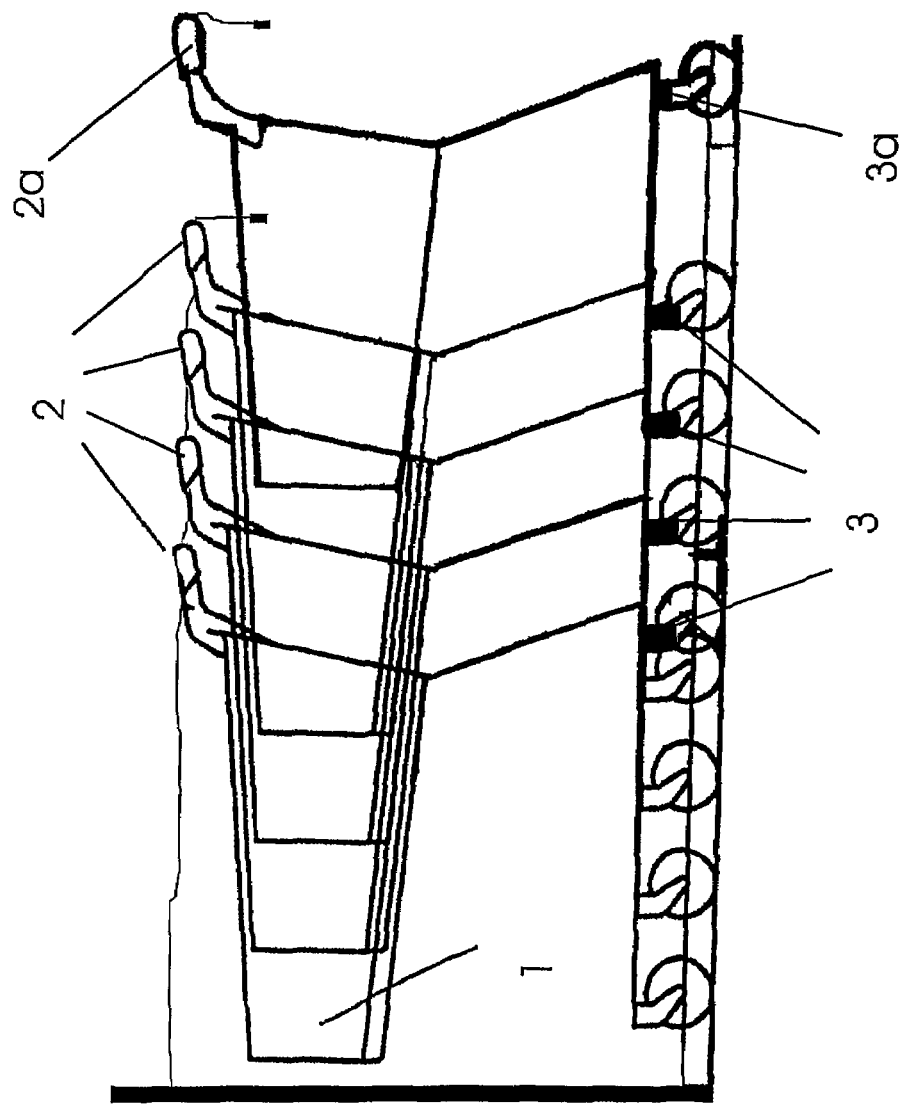

SHOPPING TROLLEY

TECHNICAL FIELD

The invention relates to a shopping trolley which is equipped with a token system and an immobilizer.

The effect of the token system is that the shopping trolley cannot be removed from a collecting station until after a token has been inserted and that the token is not returned again until the shopping trolley is taken back to a collecting station. The shopping trolley cannot be used until a token is inserted again into the token system.

The immobilizer prevents a shopping trolley from being able to be used outside a defined area.

PRIOR ART

Various types of token system are known from the prior art. There are systems in which a multiplicity of shopping trolleys which can be nested one in the other are connected by means of locks and chains. In order to use the shopping trolley, a token has to be inserted into the lock. The token is not released again until the shopping trolley is nested in another shopping trolley and is connected again to the other shopping trolley by means of the chain.

In many token systems, in order to release the token the shopping trolley has to be additionally attached to a collecting station using a further chain before the token is released.

A number of types of immobilizers are also known from the prior art. The immobilizers prevent a shopping trolley from being used outside a defined permissible area. The immobilizers comprise means for detecting the permissible area and additionally mechanically acting means for preventing use. There are immobilizers in which the shopping trolley can be blocked by means of at least one roller. In other immobilizers the steering of the shopping trolley is limited in such a way that it is no longer possible to move it in a straight line.

DISCLOSURE OF THE INVENTION

The invention consists in the fact that elements which are known from token systems interact with elements of the immobilizer and this new interaction provides a new combination with synergy effects.

The token system uses the element for holding and releasing the token and the element which blocks the roller or restricts its steering is used by the immobilizer.

BEST EMBODIMENT OF THE INVENTION

The element for holding and releasing the token comprises a sensor which detects whether the shopping trolley on which the element for holding and releasing the token is located is pushed into another shopping trolley.

The element for holding and releasing the token then activates the immobilizer and releases the token.

In order to use the shopping trolley it is necessary to insert a token into the element for holding and releasing the token. The immobilizer is then deactivated.

The activation of the immobilizer prevents unintended rolling away of the shopping trolley.

In one development of the invention there is provision for the function of the sensor to be extended to the extent that the presence of one or more further conditions is sensed and the token is only released if the further or conditions are additionally fulfilled.

One of the further conditions may be location information which ensures that the token is released only if the shopping trolley is parked at a specific location.

This makes it possible for the token to be released again only if the shopping trolley is located at a collecting point and is pushed correctly into another shopping trolley.

The collecting point must be configured in such a way that the sensor of the first shopping trolley which forms the head of a series of shopping trolleys receives information which is equivalent to that which the sensor receives if the shopping trolley is pushed into another shopping trolley.

This prevents shopping trolleys which have been pushed one into the other forming "chaotic rows" outside the collecting points which are provided according to the plan.

In the collecting point, the shopping trolleys are braked by the immobilizer and form a group of respectively individually braked shopping trolleys.

In one development of the invention there is provision for an authorized person to be able to deactivate the immobilizers of a shopping trolley or of a number of shopping trolleys using a special device without having to use a token.

This is necessary for example if the shopping trolleys are to be moved from one collecting point to another by service personnel.

If a token is inserted into the last shopping trolley, the immobilizer of the shopping trolley is deactivated and the shopping trolley can be moved.

The shopping trolley is then available for the usual purpose for transporting purchased goods.

If an attempt is made to take the shopping trolley outside the area which has been defined as the permissible area by the provider of the shopping trolley, the immobilizer is activated.

In this case the token is not released.

FIG. 1 shows the invention in a schematic illustration:

A number of shopping trolleys are parked in a stack 1. Each shopping trolley has a token element 2 for holding and releasing a token and an immobilizer 3 which acts on at least one wheel. These immobilizers 3 are functionally connected to the elements 2.

Keys which release the token are inserted into the token elements 2. At the same as the release of the token, the immobilizer 3 is activated.

The last shopping trolley is actually pushed into the stack 1. In this token element 2a there is a token, the immobilizer 3a is not activated and the shopping trolley can be moved normally.

The token element can also contain a sensor which issues the token only if the shopping trolley is pushed completely in to the trolley in front.

INDUSTRIAL APPLICABILITY

The invention an be applied industrially wherever shopping trolleys are made available on a token basis and are to be returned to a collecting point.

The invention claimed is:

1. A shopping trolley comprising a token element for holding and releasing a token and an immobilizer being optionally activated and deactivated, the immobilizer being deactivated if a token is located in the token element, the immobilizer blocking a roller of the trolley or restricting steering of the trolley, the token element including a sensor and the token is released only if the sensor has detected that the shopping trolley has been pushed into another shopping trolley.

2. The shopping trolley as claimed in claim 1, wherein the sensor requires location information and the token can be released only if valid location information is present.

3. The shopping trolley as claimed in claim 2, wherein the location information is generated by an electromagnetic, magnetic or optical source.

4. The shopping trolley as claimed in claim 2, wherein in that the immobilizer can be activated when the token is inserted provided that the shopping trolley leaves a predefinable area.

5. A shopping trolley comprising:
a token element for securing and releasing a token and
an immobilizer being optionally activated and deactivated, the immobilizer blocking a roller of the trolley or restricting steering of the trolley, the immobilizer being deactivated if a token is located in the token element.

6. A shopping trolley comprising
a token element for holding and releasing a token and
an immobilizer being optionally activated and deactivated, the immobilizer blocking a roller of the trolley or restricting steering of the trolley, the immobilizer being activated if there is no token located in the token element.

* * * * *